(12) United States Patent
Abe et al.

(10) Patent No.: US 8,365,889 B2
(45) Date of Patent: Feb. 5, 2013

(54) AUTOMATIC TRANSMISSION

(75) Inventors: Yuito Abe, Okazaki (JP); Masaaki Nishida, Anjo (JP); Tomoko Nishida, legal representative, Anjo (JP); Hiroshi Kato, Kariya (JP); Masashi Kito, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 614 days.

(21) Appl. No.: 12/585,832

(22) Filed: Sep. 25, 2009

(65) Prior Publication Data

US 2010/0129236 A1 May 27, 2010

(30) Foreign Application Priority Data

Sep. 30, 2008 (JP) ................................. 2008-253021

(51) Int. Cl.
*F16H 45/00* (2006.01)
*F16D 33/02* (2006.01)

(52) U.S. Cl. .................. 192/3.29; 192/113.1; 192/113.5

(58) Field of Classification Search ..................... 192/57
See application file for complete search history.

(56) References Cited

U.S. PATENT DOCUMENTS

| 4,108,289 | A | * | 8/1978 | Arai et al. ...................... 192/3.3 |
| 4,950,213 | A | | 8/1990 | Morisawa |
| 4,955,852 | A | | 9/1990 | Morisawa |
| 6,655,232 | B2 | | 12/2003 | Fujikawa et al. |
| 6,692,388 | B2 | | 2/2004 | Nirasawa et al. |
| 2002/0170383 | A1 | * | 11/2002 | Fujikawa et al. ........... 74/606 R |
| 2004/0050647 | A1 | | 3/2004 | Hayabuchi et al. |
| 2004/0065168 | A1 | * | 4/2004 | Ida et al. ..................... 74/606 R |

FOREIGN PATENT DOCUMENTS

| CN | 1385639 A | 12/2002 |
| JP | U 63-15359 | 2/1988 |
| JP | A 02-107859 | 4/1990 |
| JP | U 6-16760 | 3/1994 |
| JP | A-2000-283188 | 10/2000 |
| JP | A-2004-332803 | 11/2004 |
| JP | A 2008-208978 | 9/2008 |
| WO | WO 03/016736 A1 | 2/2003 |

OTHER PUBLICATIONS

International Search Report dated Dec. 22, 2009 for U.S. National Phase Application No. PCT/JP2009-066621.
Sep. 20, 2012 Office Action issued in Chinese Patent Application No. 200980113165.7 (English Translation only).

* cited by examiner

*Primary Examiner* — Rodney Bonck
(74) *Attorney, Agent, or Firm* — Oliff & Berridge, PLC (57) ABSTRACT

An automatic transmission includes a starting apparatus having a housing that rotates based on torque of a driving source, and a clutch mechanism portion positioned in the housing; an oil pump that is positioned on a side opposite to the driving source with respect to the starting apparatus in a rotational axis direction of the housing, and is driven by transmission of rotation of the housing; an oil pump housing in which the oil pump is accommodated; and a speed change mechanism that is positioned on a side opposite to the starting apparatus with respect to the oil pump housing in the rotational axis direction, and has an input shaft, which extends through the oil pump and the oil pump housing and is connected to the clutch mechanism portion.

7 Claims, 3 Drawing Sheets

FIG. 2

→ FRONT

PRIOR ART

AUTOMATIC TRANSMISSION

INCORPORATION BY REFERENCE

The disclosure of Japanese Patent Application No. 2008-253021 filed on Sep. 30, 2008 including the specification, drawings and abstract is incorporated herein by reference in its entirety.

BACKGROUND

The present invention relates to automatic transmissions that are mounted on vehicles.

Figure 4:
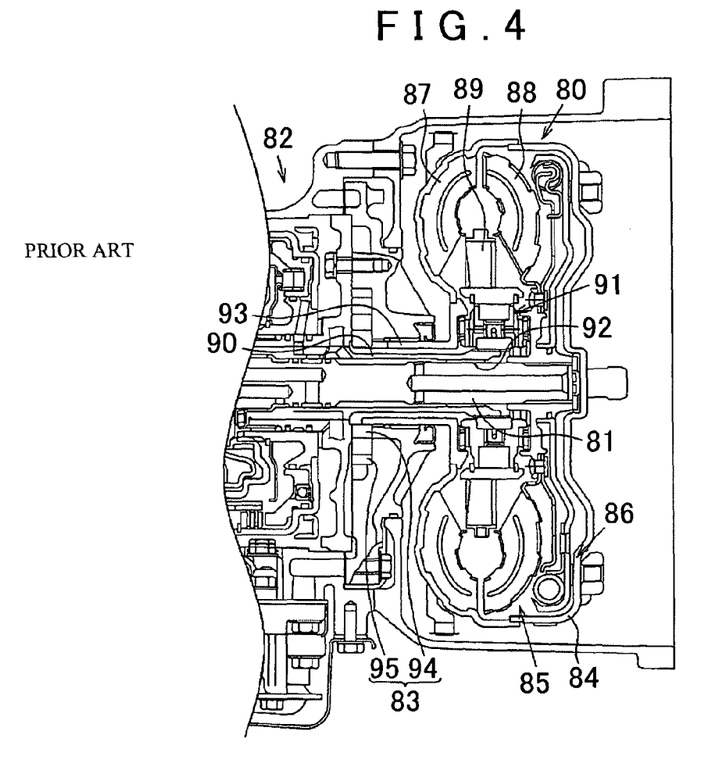
FIG. 4 is a partial schematic illustration of a conventional automatic transmission.

Conventionally, automatic transmissions described in Japanese Patent Application Publication No. JP-A-2004-332803 have been proposed as automatic transmissions that are mounted on vehicles. As shown in FIG. 4, such an automatic transmission includes a hydraulic torque transfer apparatus 80 to which torque from an engine as a driving source is transferred, a speed change mechanism 82 having an input shaft 81 extended into the hydraulic torque transfer apparatus 80, and an oil pump 83 positioned between the hydraulic torque transfer apparatus 80 and the speed change mechanism 82. The hydraulic torque transfer apparatus 80 is provided with a housing 84, which is connected to an output shaft of the engine and is filled with hydraulic oil as a fluid, a torque converter 85 positioned in the housing 84, and a lockup clutch mechanism 86. Note that a cylindrical pump drive shaft 93 for transferring torque from the engine to the oil pump 83 is provided in the housing 84, and an intermediate part of the input shaft 81 (a part in a lateral direction in FIG. 4) is accommodated in the pump drive shaft 93.

The torque converter 85 includes a pump impeller 87 connected to the housing 84, a turbine runner 88 connected to the input shaft 81 so as to face the pump impeller 87, and a stator 89 positioned between the pump impeller 87 and the turbine runner 88. This stator 89 is supported by a substantially cylindrical stator shaft 90, which extends along the lateral direction in FIG. 4, via a one-way clutch 91. A support member 92, such as a bush, for supporting the input shaft 81 rotatably with respect to the stator shaft 90 is provided in the stator shaft 90 at substantially the same position as that of the stator 89 in the extending direction (the lateral direction in FIG. 4). Note that the stator shaft 90 is extended into the speed change mechanism 82, and an intermediate part of the stator shaft 90 in the extending direction is positioned in a space between an inner peripheral surface of the pump drive shaft 93 and an outer peripheral surface of the input shaft 81.

The oil pump 83 is provided with a drive gear 94 connected to the pump drive shaft 93, and a driven gear 95 positioned on the outer peripheral side of the drive gear 94. In the case where the housing 84 rotates by toque transfer from the engine, the oil pump 83 is always driven because the pump drive shaft 93 rotates.

SUMMARY

Reduction in fuel consumption of vehicles has been strongly required in recent years. One possible method for reducing fuel consumption in automatic transmissions is to reduce the size of the oil pump 83 that is always driven when the engine torque is transferred to the housing 84. That is, reducing the size of the oil pump 83 reduces the engine load placed when the housing 84 rotates, whereby fuel consumption of vehicles is reduced accordingly.

However, in the automatic transmission described in Japanese Patent Application Publication No. JP-A-2004-332803, a multiplicity of parts, such as the input shaft 81 and the stator shaft 90, are positioned in the pump drive shaft 93 for transmitting rotation of the housing 84 to the oil pump 83. Reduction in diameter of the input shaft 81 and the stator shaft 90 is limited in view of rigidity and the like of the components. Thus, in automatic transmissions having the torque converter 85, reduction in diameter of the oil pump 83 is limited, and there is room for improvement in terms of reduction in fuel consumption of vehicles.

Thus, automatic transmissions, which include a starting apparatus having no torque converter (especially, no stator), have been recently proposed in order to reduce the size (the diameter) of the oil pump 83. In such automatic transmissions, no stator shaft 90 is provided since there is no stator 89. Thus, in automatic transmissions having no torque converter, the stator shaft 90 can be omitted, whereby the diameter of the pump drive shaft 93 can be reduced accordingly, and thus, the size of the oil pump 83 can be reduced. However, there is a problem in that the support member 92, which supports the input shaft 81 in the stator shaft 90 in automatic transmissions having the torque converter 85, cannot be provided in the automatic transmissions having no torque converter 85. That is, further improvement is required in order to support the input shaft 81 in a preferable manner.

The present invention has been developed in view of the above problems, and it is an object of the present invention to provide an automatic transmission capable of contributing to reduction in fuel consumption of vehicles by reducing the size of an oil pump, and capable of supporting an input shaft of a speed change mechanism in a preferable manner.

In order to achieve the above object, an automatic transmission according to the present invention includes: a starting apparatus having a housing that rotates based on torque of a driving source, and a clutch mechanism portion positioned in the housing; an oil pump that is positioned on a side opposite to the driving source with respect to the starting apparatus in a rotational axis direction of the housing, and is driven by transmission of rotation of the housing; an oil pump housing in which the oil pump is accommodated; and a speed change mechanism that is positioned on a side opposite to the starting apparatus with respect to the oil pump housing in the rotational axis direction, and has an input shaft, which extends through the oil pump and the oil pump housing and is connected to the clutch mechanism portion. In the automatic transmission, the clutch mechanism portion operates so as to selectively allow and block torque transfer from the driving source to the input shaft, the housing includes a cylindrical pump drive shaft extending along the rotational axis toward the oil pump housing, where the pump drive shaft has an inner peripheral surface that faces an outer peripheral surface of the input shaft, the oil pump is positioned on an outer peripheral side of the pump drive shaft, the oil pump housing has a pump through hole, which is provided at a position between the oil pump and the speed change mechanism in the rotational axis direction, and through which the input shaft extends, and a support member for rotatably supporting the input shaft at an end on the oil pump side of the pump through hole is positioned between an inner peripheral surface of the pump through hole and the outer peripheral surface of the input shaft.

According to the above structure, the starting apparatus has no mechanism for amplifying the torque of the driving source and transferring the torque to the speed change mechanism. Thus, it is not necessary to provide the automatic transmission with various parts (a stator, a one-way clutch, a stator shaft, and the like) of the mechanism for amplifying the torque of the driving source. Therefore, only the input shaft is positioned in the pump drive shaft for transmitting a driving force to the oil pump. Since the stator shaft can be omitted, the oil pump can be reduced in size accordingly. Thus, the above structure can reduce the size of the oil pump, and can contribute to reduction in fuel consumption of vehicles. Moreover, the support member for rotatably supporting the input shaft is provided in the pump through hole. That is, in the present invention, the input shaft can be supported in a preferable manner without hindering reduction in size of the oil pump. Thus, the torque from the driving source can be stably transferred to the speed change mechanism.

In an aspect of the present invention, the housing is structured so that oil circulates therein, and a discharge flow path for discharging the oil that has circulated in the housing out of the housing is formed by the outer peripheral surface of the input shaft, the inner peripheral surface of the pump drive shaft and the support member.

If the support member for supporting the input shaft is positioned closer to the starting apparatus than the oil pump, a new member for supporting the support member needs to be separately provided in the pump drive shaft. Such a new member is structured to extend from the oil through hole side to a position where the support member is provided, while extending between the inner peripheral surface of the pump drive shaft and the outer peripheral surface of the input shaft. In this case, the size of the pump drive shaft needs to be increased by an amount corresponding to the thickness of the new member, whereby the size of the oil pump is increased. On the other hand, since the support member is positioned closer to the speed change mechanism than the oil pump, no member is positioned in the pump drive shaft, except for the input shaft. Thus, the diameter of the oil pump can be reduced while supporting the input shaft in a preferable manner.

Moreover, in the present invention, the discharge flow path is formed by the pump drive shaft, the input shaft, and the support member. Thus, oil, which has flown from the housing into the discharge flow path, is restrained by the support member from leaking toward the pump through hole. Accordingly, the oil can be smoothly circulated in the housing.

Moreover, in the present invention, the discharge flow path is formed by the pump drive shaft, the input shaft, and the support member. Thus, oil, which has flown from the housing into the discharge flow path, is restrained by the support member from leaking toward the pump through hole. Accordingly, the oil can be smoothly circulated in the housing.

According to the above structure, by increasing the oil pressure in the supply space, the clutch mechanism portion can be operated to allow the torque transfer from the driving source to the input shaft.

In an aspect of the present invention, the clutch mechanism portion has a connection member for connecting to the input shaft, the supply space is provided at a position adjacent to the connection member, a first supply flow path extending along the rotational axis, a second supply flow path extending from the first supply flow path toward the connection member, and a third supply flow path extending from the first supply flow path toward a position located closer to the speed change mechanism than the support member in the pump through hole are formed in the input shaft, a communication flow path for allowing the second supply flow path and the supply space to communicate with each other is formed in the connection member, and the clutch mechanism portion allows the torque transfer from the driving source to the input shaft when the oil is supplied into the supply space through the third supply flow path, the first supply flow path, the second supply flow path, and the communication flow path.

According to the above structure, the oil, which has sequentially flown through the third supply flow path, the first supply flow path, and the second supply flow path, which are formed in the input shaft, and the communication flow path formed in the connection member in this order, is supplied into the supply space, whereby the clutch mechanism portion can be operated to transfer the torque from the driving source to the input shaft. Moreover, since the oil is supplied into the supply space via the flow paths formed in the input shaft, it is not necessary to provide a separate member for forming a flow path between the outer peripheral surface of the input shaft and the inner peripheral surface of the pump drive shaft. This can suppress an increase in the number of parts that are accommodated in the pump drive shaft, and thus, can suppress an increase in diameter of the oil pump accordingly.

In an aspect of the present invention, the housing is structured so that the oil circulates therein, a first circulation flow path having an opening that opens in the housing and extending along the rotational axis, and a second circulation flow path extending from the first circulation flow path toward a position located closer to the speed change mechanism than the support member in the pump through hole are formed in the input shaft, and the oil is supplied into the housing through the second circulation flow path and the first circulation flow path, while the oil is discharged from the housing through the discharge oil passage.

According to the above structure, oil is supplied into the housing through the second circulation flow path and the first circulation flow path, while the oil is discharged from the housing through the discharge oil passage. Thus, the oil can be circulated in the housing in a preferable manner. Moreover, since the oil is supplied into the housing via the flow paths formed in the input shaft, it is not necessary to provide a separate member for forming a flow path between the outer peripheral surface of the input shaft and the inner peripheral surface of the pump drive shaft. This can suppress an increase in the number of parts that are accommodated in the pump drive shaft, and thus, can suppress an increase in diameter of the oil pump accordingly.

In an aspect of the present invention, the second circulation flow path has a circulation opening formed in the outer peripheral surface of the input shaft, the third supply flow path has an operation opening formed in the outer peripheral surface of the input shaft, the circulating opening is positioned closer to the oil pump than the operation opening, and annular outflow restraining members for restraining the oil, which is supplied into the third supply flow path through the operation opening, from at least partially flowing to outside along the outer peripheral surface of the input shaft are respectively provided on both sides of the operation opening in the rotational axis direction in the pump through hole.

According to the above structure, the oil, which is to be circulated in the housing, is supplied from the circulation opening into the second circulation flow path, while oil for operating the clutch mechanism portion is supplied from the operation opening into the third supply flow path. Note that the oil pressure of the oil, which is supplied from the circulation opening so as to be circulated in the housing, is lower than that of the oil, which is supplied from the operation opening so as to operate the clutch mechanism portion, since the oil to be circulated in the housing need not operate the members in the housing. Thus, by positioning the support member between the circulation opening and the oil pump, the oil having a low oil pressure, which is supplied into the second circulation flow path through the circulation opening, can be restrained from partially leaking toward the discharge flow path along the outer peripheral surface of the input shaft, without proving a dedicated member such as a seal ring.

In an aspect of the present invention, an annular outflow restraining member for restraining the oil, which is supplied into the second circulation flow path through the circulation opening, from at least partially flowing toward the operation opening along the outer peripheral surface of the input shaft is provided closer to the operation opening than the circulation opening in the pump through hole, the support member has a support portion for supporting the input shaft, and a restraining portion for restraining the oil, which is supplied into the second circulation flow path through the circulation opening, from at least partially flowing toward the oil pump along the outer peripheral surface of the input shaft, and the support portion and the regulating portion are formed integrally.

In general, it is desirable to position a dedicated member having a sealing function (e.g., a seal ring) between the circulation opening and the oil pump in order to restrain the hydraulic oil, which has flown out of the input shaft through the circulation opening, from partially leaking toward the discharge flow path along the outer peripheral surface of the input shaft. In order to provide such a seal ring, an annular groove is formed between the circulation opening and the oil pump in the outer peripheral surface of the input shaft, and the seal ring is accommodated in the groove. However, since the support member in which the restraining portion and the support portion are formed integrally is used in the present invention, it is not necessary to provide a seal ring separately from the support member. Thus, since no seal ring and no groove for accommodating the seal ring need be provided between the circulation opening and the oil pump in the outer peripheral surface of the input shaft, the axial length of the input shaft can be reduced accordingly. That is, the automatic transmission can be reduced in size in the rotational axis direction.

In an aspect of the present invention, the restraining portion is positioned closer to the oil pump than the support portion.

According to the above structure, the oil, which has flown from the circulation opening toward the discharge flow path along the outer peripheral surface of the input shaft, is restrained to some degree by the support portion having a certain level of a sealing function from leaking toward the discharge flow path along the outer peripheral surface of the input shaft. The oil, which has failed to be restrained by the support member from leaking toward the discharge flow path, is restrained by the restraining portion from leaking toward the discharge flow path. That is, in the present invention, the oil can be restrained in two stages from leaking from the circulation opening toward the discharge flow path along the outer peripheral surface of the input shaft.

DETAILED DESCRIPTION OF EMBODIMENTS

An embodiment of the present invention will be described with reference to FIGS. 1 through 3. Note that, as used herein, the term "front" refers to the right side in FIGS. 1 and 2, and the term "rear" refers to the left side in FIGS. 1 and 2.

Figure 1:
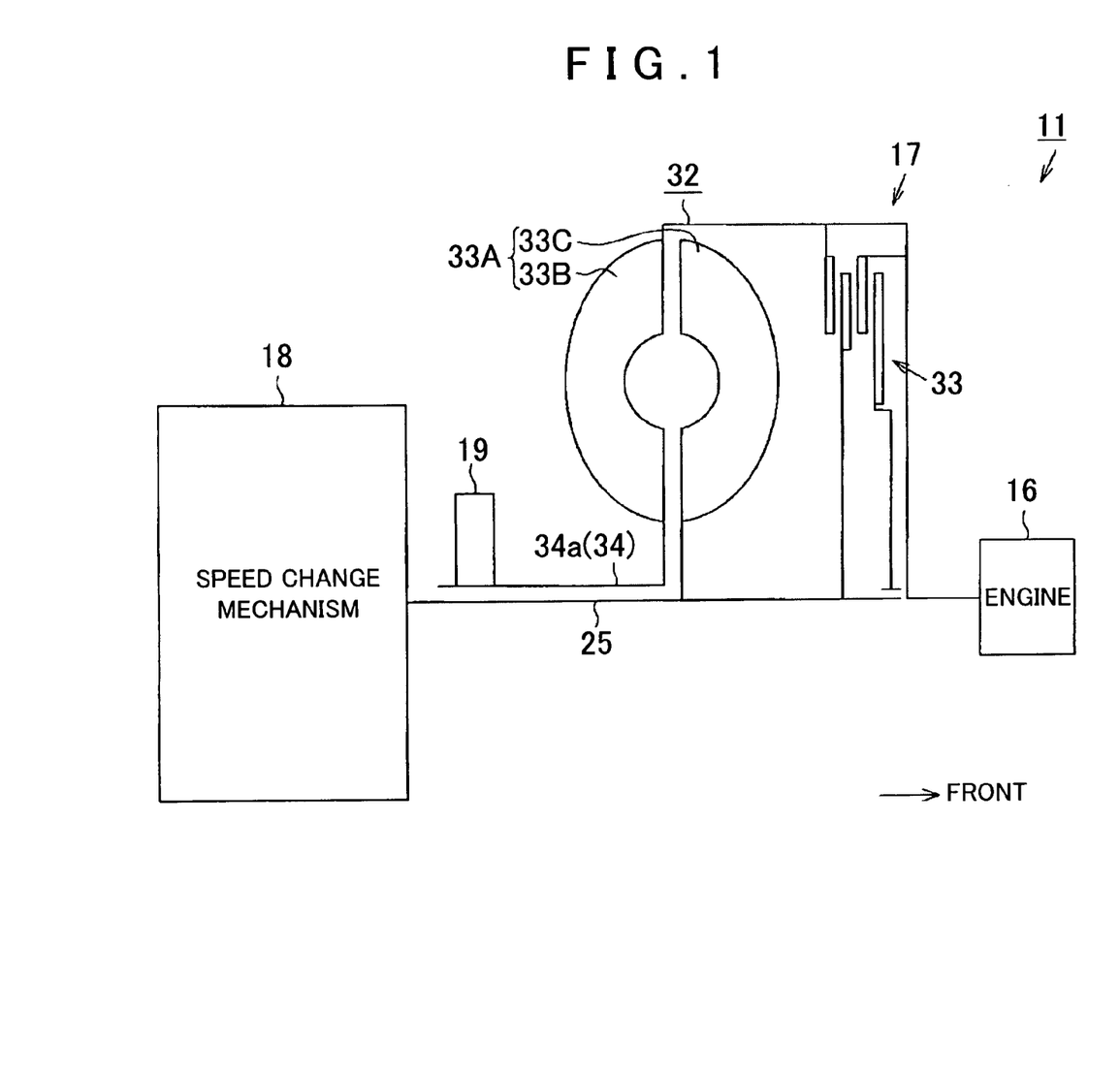
FIG. 1 is a schematic view of an automatic transmission according to an embodiment.
Figure 2:
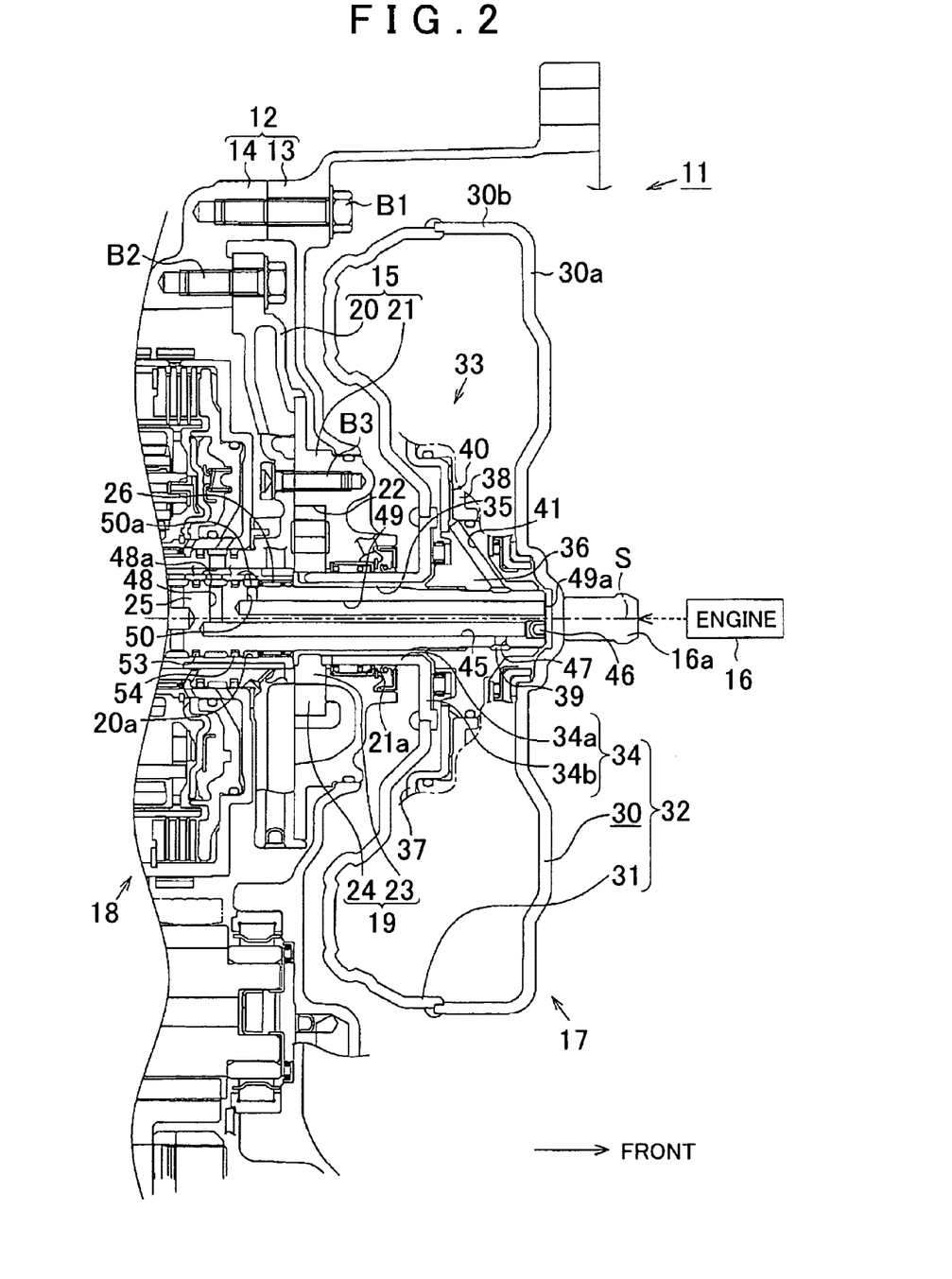
FIG. 2 is a partial schematic illustration of the automatic transmission.

As shown in FIGS. 1 and 2, an automatic transmission 11 of the present embodiment includes a main body case 12, and a drain tank, not shown, which is positioned under the main body case 12, and hydraulic oil is stored in the drain tank. The main body case 12 is formed by a substantially cylindrical starting apparatus case 13, and a substantially cylindrical bottomed transmission case 14 whose rear end, not shown, is closed and front end is open. The main body case 12 is formed by fixedly fastening a rear end of the starting apparatus case 13 and the front end of the transmission case 14 by a plurality of bolts B1 (only one bolt is shown in FIG. 1).

In the main body case 12, an oil pump housing 15 is fixedly fastened to the front end of the transmission case 14 by a plurality of bolts B2 (only one bolt is shown in FIG. 1) so as to close the opening of the transmission case 14. A starting apparatus 17, to which torque from an engine 16 as a driving source is transferred, is accommodated in the starting apparatus case 13, and a speed change mechanism 18 is accommodated in the transmission case 14. An oil pump 19 is accommodated in the oil pump housing 15.

The oil pump housing 15 is formed by a circular, flat plate-shaped oil pump cover 20, and a conical disc-shaped oil pump body 21 whose front end bulges in a conical shape. A pump recess 22 is formed in a rear end of the oil pump body 21. In the state where the front end of the oil pump cover 20 and the rear end of the oil pump body 21 in which the pump recess 22 is formed are bonded together, the oil pump cover 20 and the oil pump body 21 are fixedly fastened together by a plurality of bolts B3 (only one bolt is shown in FIG. 1), whereby the pump recess 22 is closed, and the oil pump 19 is accommodated in the closed space. This oil pump 19 is an inner mesh gear pump, and has a drive gear 23 (also referred to an "inner gear"), which rotates when the torque of the engine 16 is transferred thereto, and a driven gear 24 (also referred to as an "outer gear"), which is positioned on the outer peripheral side of the drive gear 23. The oil pump 19 is driven to supply the hydraulic oil pumped up from the drain tank to the speed change mechanism 18 and the starting apparatus 17 when the torque of the engine 16 is transferred thereto.

A communication hole 20a, as a pump through hole for allowing the pump recess 22 and the mission case 14 to communicate with each other, is formed in the oil pump cover 20, and a communication hole 21a, as a pump through hole for allowing the starting apparatus case 13 and the pump recess 22 to communicate with each other, is formed in the oil pump body 21. An intermediate part of an input shaft 25 of the speed change mechanism 18 in a longitudinal direction is positioned in each communication hole 20a, 21a. An annular support member 26 for rotatably supporting the input shaft 25 of the speed change mechanism 18 is provided in the communication hole 20a of the oil pump cover 20. The support member 26 is provided at a front end of the communication hole 20a, that is, an end of the communication hole 20a located on the oil pump 19 side. Note that the input shaft 25 of the speed change mechanism 18 is extended through the communication holes 20a, 21a to the starting apparatus 17 side.

The starting apparatus 17 includes a starting apparatus housing 32, which is formed by a substantially cylindrical bottomed front cover 30 connected to an engine output shaft 16a extended from the engine 16, a pump cover 31 fixed to an outer peripheral end of the front cover 30 by welding, and a pump drive shaft 34 extending from the pump cover 31 toward the speed change mechanism 18 (toward the rear) in a rotational axis S direction (the longitudinal direction in the present embodiment). The starting apparatus housing 32 is structured so that the hydraulic oil filled in the starting apparatus housing 32 circulates therein. A clutch mechanism portion 33 for mechanically transferring the torque of the engine 16 to the input shaft 25 of the speed change mechanism 18, and a fluid coupling 33A for transferring the torque of the engine 16 to the input shaft 25 of the speed change mechanism 18 by using the hydraulic oil in the starting apparatus housing 32 are accommodated in the starting apparatus housing 32. Moreover, a damper apparatus, not shown, for absorbing vibration components contained in the torque from the engine 16 when the torque is transferred by the clutch mechanism portion 33, is accommodated in the starting apparatus housing 32. Note that the fluid coupling 33A has a drive member 33B fixed to the pump cover 31, and a driven member 33C connected to the input shaft 25.

The front cover 30 is integrally formed by a bottom 30a, which has a substantially disc shape when the front cover 30 is viewed in plan from the front side thereof, and a cylindrical portion 30b, which is formed about a predetermined rotational axis S (shown by a single-dot chain line in FIG. 1) extending through a radial center of the bottom 30a in the longitudinal direction. The front cover 30 rotates in a predetermined rotation direction about the rotational axis S when the torque of the engine 16 is transferred thereto.

The pump cover 31 has a substantially annular shape capable of closing a rear opening of the cylindrical portion 30b of the front cover 30. The pump drive shaft 34 for transmitting a driving force to the oil pump 19 is fixed to the center of the pump cover 31. This pump drive shaft 34 has a cylindrical portion 34a extending along the longitudinal direction, and a flange portion 34b provided at a front end of the cylindrical portion 34a. An intermediate portion of the cylindrical portion 34a in the longitudinal direction is rotatably accommodated in the communication hole 21a of the oil pump body 21. A rear end of the cylindrical portion 34a (a first end of the pump drive shaft 34) is connected to the drive gear 23 of the oil pump 19, and an outer edge of the flange portion 34b (a second end of the pump drive shaft 34) is fixed to the pump cover 31. An intermediate portion of the input shaft 25 of the speed change mechanism 18 in the longitudinal direction is located in the cylindrical portion 34a of the pump drive shaft 34. That is, no other member is positioned between an inner peripheral surface of the cylindrical portion 34a and an outer peripheral surface of the input shaft 25. A discharge flow path 35 for partially discharging the hydraulic oil, which has circulated in the starting apparatus housing 32, toward the speed change mechanism 18 through the oil pump cover 20 and a valve body, not shown, is formed between the inner peripheral surface of the cylindrical portion 34a of the pump drive shaft 34 and the outer peripheral surface of the input shaft 25.

In the starting apparatus housing 32, a substantially cylindrical turbine hub (a connection member) 36, which is immovably supported by the input shaft 25, is provided on the outer peripheral side of the input shaft 25. This turbine hub 36 immovably supports a turbine shell 37 that supports the driven member 33C of the fluid coupling 33A at a rear end of the turbine shell 37. Moreover, the turbine hub 36 supports a piston 38 in a longitudinally movable state, where the piston 38 has a substantially annular shape when viewed in plane, and is positioned forward of the turbine shell 37. An annular hydraulic oil storage chamber 39 is recessed between an inner peripheral surface of the turbine hub 36 and the outer peripheral surface of the input shaft 25. A communication flow path 41 for allowing the hydraulic oil storage chamber 39 and a supply space 40, which is formed between the turbine shell 37 and the piston 38 in the longitudinal direction, to communicate with each other is formed the turbine hub 36.

Note that the piston 38 is one of members of the clutch mechanism portion 33. When the piston 38 moves forward, the clutch mechanism portion 33 is brought into a state where the clutch mechanism portion 33 is able to transfer the torque. The clutch mechanism portion 33 operates to selectively allow and block torque transfer from the engine 16 (more specifically, the starting apparatus housing 32 connected to the engine output shaft 16a) to the input shaft 25 of the speed change mechanism 18, according to forward and rearward movement of the piston 38. That is, the clutch mechanism portion 33 is switched between an engaged state where the clutch mechanism portion 33 allows torque transfer, and a disengaged state where the clutch mechanism portion 33 blocks torque transfer, according to the movement of the piston 38. Although not specifically shown in the figure, the clutch mechanism portion 33 has a first friction engaging portion and a second friction engaging portion, which are positioned so as to face each other, and the first friction engaging portion and the second friction engaging portion are switched by the piston 38 between a state where the first friction engaging portion and the second friction engaging portion are frictionally engaged with each other, and a state where the first friction engaging portion and the second friction engaging portion are separated from each other. Thus, the clutch mechanism portion 33 is switched between the engaged state and the disengaged state.

The structure of various flow paths formed in the input shaft 25 will be described below with reference to FIG. 2.

As shown in FIG. 2, a flow path for supplying hydraulic oil from the speed change mechanism 18 side into the hydraulic oil storage chamber 39 is formed in the input shaft 25. More specifically, a first supply path 45, which extends from an intermediate portion of the input shaft 25 in the longitudinal direction to a front end of the input shaft 25, is formed in the input shaft 25. A rear end of the first supply flow path 45 is located in the oil pump cover 20, and a front end thereof is closed by a blocking member 46. A second supply flow path 47 for allowing the first supply flow path 45 and the hydraulic oil storage chamber 39 to communicate with each other is provided at the same position as that of the turbine hub 36 in the input shaft 25 in the longitudinal direction, and is extended radially outward about the rotational axis S. Moreover, a third supply flow path 48, which extends radially outward from the rear end of the first supply flow path 45, is formed in a portion of the input shaft 25, which is located in the speed change mechanism 18. The hydraulic oil, which has flown from the speed change mechanism 18 side into the third supply flow path 48, flows into the hydraulic oil storage chamber 39 through the first supply flow path 45 and the second supply flow path 47. After being temporarily stored in the hydraulic oil storage chamber 39, the oil is supplied into the supply space 40 through the communication flow path 41. As a result, the hydraulic oil pressure in the supply space 40 is increased, whereby the piston 38 moves forward.

A flow path for supplying the hydraulic oil that circulates in the starting apparatus housing 32 is also formed in the input shaft 25. More specifically, a first circulation flow path 49, which extends from the front end of the input shaft 25 to an intermediate portion thereof in the longitudinal direction, is formed in the input shaft 25. A front end of the first circulation flow path 49 is an opening 49a that is open at the front end of the input shaft 25, and a rear end of the first circulation flow path 49 is positioned between the rear end of the first supply flow path 45 and the oil pump 19 in the longitudinal direction. A second circulation flow path 50, which extends from the rear end of the first circulation flow path 49 radially outward about the rotational axis S, is formed in a portion of the input shaft 25 located in the speed change mechanism 18. Hydraulic oil supplied into the second circulation flow path 50 flows forward in the first circulation flow path 49, and is discharged from the opening 49a into a space between the front end of the input shaft 25 and the bottom 30a of the front cover 30. Thereafter, this hydraulic oil circulates in the starting apparatus housing 32, and then, is discharged out of the starting apparatus housing 32 through the discharge flow path 35.

The hydraulic oil pressure in each supply flow path 45, 47, 48 (hereinafter referred to as the "supply oil pressure") is an oil pressure for moving the piston 38 forward to operate the clutch mechanism portion 33. On the other hand, the hydraulic oil pressure in each circulation flow path 49, 50 (hereinafter referred to as the "circulation oil pressure") is an oil pressure of the hydraulic oil that is circulated in the starting apparatus housing 32. Thus, the circulation oil pressure is lower than the supply oil pressure.

The structure for providing airtight flow paths on the outer peripheral surface side of the input shaft 25 will be described below with reference to FIGS. 2 and 3.

Figure 3:
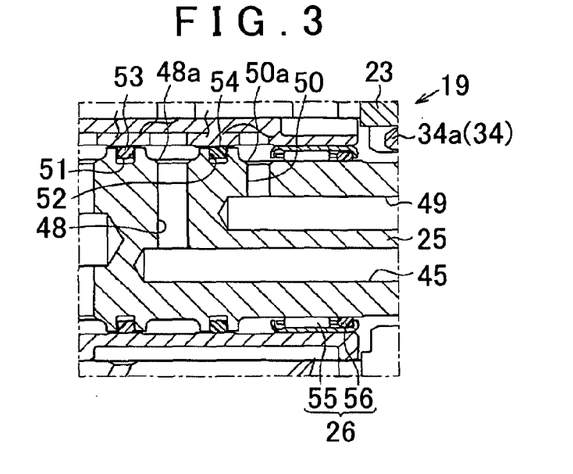
FIG. 3 is a partial enlarged view of the automatic transmission of FIG. 2.

As shown in FIGS. 2 and 3, an annular groove 51 is formed rearward of an operation opening 48a of the third supply flow path 48 in the outer periphery of the input shaft 25. Moreover, an annular groove 52 is formed between the operation opening 48a and a circulation opening 50a of the second circulation flow path 50 in the longitudinal direction in the outer peripheral surface of the input shaft 25. Synthetic resin seal rings (outflow restraining members) 53, 54 for restraining the hydraulic oil, which should be supplied into the third supply flow path 48, from leaking along the outer peripheral surface of the input shaft 25 are provided in the grooves 51, 52, respectively. Note that the seal ring 54 restrains the hydraulic oil, which is to be supplied into the second circulation flow path 50 through the circulation opening 50a, from partially leaking toward the operation opening 48a along the outer peripheral surface of the input shaft 25.

As described above, the annular support member 26 is provided in front of the circulation opening 50a on the outer peripheral surface of the input shaft 25. This support member 26 has a support portion 55, such as a bearing, that rotatably supports the input shaft 25, and a restraining portion 56 made of a synthetic resin, which is positioned forward of the support portion 55 and has a sealing function. The support portion 55 and the restraining portion 56 are formed integrally. That is, the support member 26 of the present embodiment is a so-called sealing bearing. Note that the sealing function of the restraining portion 56 of the support member 26 is typically somewhat inferior to that of the seal rings 53, 54. However, the oil pressure of the hydraulic oil that is supplied from the circulation opening 50a into the second circulation flow path 50 (a circulation oil pressure) is lower than the oil pressure of the hydraulic oil that is supplied from the operation opening 48a into the input shaft 25 (a supply oil pressure). Thus, the support member 26 (the restraining portion 56), which has an inferior sealing function to that of the seal rings 53, 54, sufficiently restrains the hydraulic oil, which is to be supplied into the second circulation flow path 50 through the circulation opening 50a, from partially leaking toward the discharge flow path 35 along the outer peripheral surface of the input shaft 25.

Thus, the present embodiment can provide the following effects.

(1) The starting apparatus 17 has no torque converter that amplifies the torque of the engine 16 and transfers the torque to the speed change mechanism 18. Thus, it is not necessary to provide a stator and a one-way clutch that constitute a torque converter, a stator shaft for supporting the stator and the one-way clutch, and the like, in the automatic transmission 11. Since the stator shaft can be omitted, the size of the oil pump 19 can be reduced accordingly. Thus, the size of the oil pump 19 can be reduced, which can contribute to reduction in fuel consumption of vehicles.

(2) The starting apparatus 17 of the present embodiment has no torque converter, and thus, is reduced in size accordingly. Thus, even though the support member 26 for rotatably supporting the input shaft 25 of the speed change mechanism 18 is positioned inside the front end of the input shaft 25 (more specifically, closer to the speed change mechanism 18 than the oil pump 19), the input shaft 25 can be prevented from being displaced when the input shaft 25 is rotated.

(3) Since the support member 26 is positioned rearward of the oil pump 19, only the input shaft 25 is accommodated in the pump drive shaft 34 for transmitting a driving force to the oil pump 19. Thus, unlike automatic transmissions that have a torque converter, the stator shaft can be omitted, and the diameter of the pump drive shaft 34 can be reduced accordingly. As a result, the diameter of the drive gear 23 and the driven gear 24 of the oil pump 19 can be reduced. This can contribute to reduction in size of the oil pump 19 that is driven based on rotation of the pump drive shaft 34, and can contribute to reduction in fuel consumption of vehicles.

(4) If the support member 26 for rotatably supporting the input shaft 25 is positioned closer to the starting apparatus 17 than the oil pump 19, it is necessary to separately provide a new member for supporting the support member 26 in the pump drive shaft 34. Such a new member is structured to extend from the communication hole 20a side and between an inner peripheral surface of the pump drive shaft 34 and the outer peripheral surface of the input shaft 25 to the position of the support member 26. In this case, it is necessary to increase the size of the pump drive shaft 34 by an amount corresponding to the thickness of the new member, whereby the size of the oil pump 19 is increased. On the other hand, in the present embodiment, since the support member 26 is positioned closer to the speed change mechanism 18 than the oil pump 19, no member is positioned in the pump drive shaft 34, except for the input shaft 25. Thus, the diameter of the oil pump 19 can be reduced while supporting the input shaft 25.

(5) In the present embodiment, the discharge flow path 35 is formed by the pump drive shaft 34, the input shaft 25, and the support member 26. Thus, the support member 26 restrains the hydraulic oil, which has flown from the starting apparatus housing 32 to the discharge flow path 35, from leaking toward the communication hole 20a. Thus, the hydraulic oil can be smoothly circulated in the starting apparatus housing 32.

(6) Moreover, since the support member 26 has a sealing function, no dedicated seal member for preventing the hydraulic oil in the discharge flow path 35 from flowing toward the communication hole 20a along the outer peripheral surface of the input shaft 25 need be provided separately from the support member 26. This can reduce the number of parts, and can reduce the axial length of the input shaft 25 as compared to the case where a dedicated seal member is provided.

(7) Since the hydraulic oil, which is to be circulated in the starting apparatus housing 32, partially flows into the first circulation flow path 49 and the second circulation flow path 50, the circulation oil pressure of the hydraulic oil that is supplied to the second circulation flow path 50 through the circulation opening 50a is lower than the supply oil pressure of the hydraulic oil that flows in each supply flow path 45, 47, 48. Thus, by positioning the support member 26 of the present embodiment between the circulation opening 50a and the discharge flow path 35, the hydraulic oil, which is to be supplied into the second circulation flow path 50 through the circulation opening 50a, can be restrained from partially leaking toward the discharge flow path 35 along the outer peripheral surface of the input shaft 25, without providing any dedicated member such as a seal ring.

(8) In general, it is desirable to position a seal ring and the like between the circulation opening 50a and the discharge flow path 35 in order to restrain the hydraulic oil, which is to be supplied into the second circulation flow path 50 through the circulation opening 50a, from partially leaking toward the discharge flow path 35 along the outer peripheral surface of the input shaft 25. In order to provide such a seal ring, an annular groove is formed between the circulation opening 50a and the discharge flow path 35 in the outer peripheral surface of the input shaft 25, and the seal ring is accommodated in the groove. However, since the support member 26 in which the restraining portion 56 and the support portion 55 are formed integrally is used in the present embodiment, it is not necessary to provide a seal ring separately from the support member 26. Thus, since no seal ring and no groove for accommodating the seal ring need be provided between the circulation opening 50a and the discharge flow path 35 in the outer peripheral surface of the input shaft 25, the axial length of the input shaft 25 can be reduced accordingly. That is, the automatic transmission 11 can be reduced in size in the longitudinal direction.

(9) The hydraulic oil, which is to be supplied into the second circulation flow path 50 through the circulation opening 50a, is restrained to some degree by the support portion 55 having a certain level of a restraining function, and the hydraulic oil, which has passed the support portion 55, is restrained by the restraining portion 56 from leaking toward the discharge flow path 35. That is, in the present embodiment, the hydraulic oil can be restrained in two stages from leaking from the circulation opening 50a toward the discharge flow path 35 along the outer peripheral surface of the input shaft 25. Thus, even if no seal ring is provided, the hydraulic oil, which is flowing from the circulation opening 50a toward the outside of the input shaft 25, can be restrained from flowing into the discharge flow path 35 along the outer peripheral surface of the input shaft 25.

(10) In the present embodiment, the seal rings 53, 54 having a high sealing function are provided on both sides of the operation opening 48a in the longitudinal direction, respectively, whereby the hydraulic oil, which is to be supplied into the third supply flow path 48 through the operation opening 48a, can be restrained in a preferable manner from leaking to the outside along the outer peripheral surface of the input shaft 25. Thus, the difference between a control oil pressure, which is set by a control device, not shown, and a hydraulic oil pressure, which is actually supplied into the supply space 40, can be reduced as much as possible. This can contribute to a fast operation of the clutch mechanism portion 33, and can reduce vibration, which is generated when the clutch mechanism portion 33 is switched to the engaged state, as much as possible.

(11) The seal ring 54 functions as an outflow restraining member for restraining the hydraulic oil that is to be supplied to the flow paths 48, 50 through the openings 48a, 50a, respectively from flowing out. Thus, the axial length of the input shaft 25 can be reduced as compared to the case where a member for restraining the hydraulic oil from leaking forward from the operation opening 48a along the outer peripheral surface of the input shaft 25, and a member for restraining the hydraulic oil from leaking rearward from the circulation opening 50a along the outer peripheral surface of the input shaft 25 are provided separately. That is, the automatic transmission 11 can be reduced in size in the longitudinal direction.

Note that the present embodiment may be modified to other embodiments shown below.

In the embodiment, the support member 26 may be structured so that the restraining portion 56 is positioned rearward of the support potion 55.

In the embodiment, a seal ring for restraining the hydraulic oil from leaking forward from the operation opening 48a along the outer peripheral surface of the input shaft 25, and a seal ring for restraining the hydraulic oil from leaking rearward from the circulating opening 50a along the outer peripheral surface of the input shaft 25 may be provided separately between the operation opening 48a and the circulation opening 50a in the longitudinal direction.

In the embodiment, the support member 26 may not have a sealing function, that is, may not have the restraining portion 56. In this case, it is desirable that a seal ring, for restraining the hydraulic oil, which is to be supplied into the second circulation flow path 50 through the circulation opening 50a, from partially leaking toward the discharge flow path 35 along the outer peripheral surface of the input shaft 35, be provided between the circulation opening 50a and the discharge flow path 35. This structure can reliably restrain the hydraulic oil from leaking from the circulation opening 50a toward the discharge flow path 35 along the outer peripheral surface of the input shaft 25, although the axial length of the input shaft 25 is increased as compared to the above embodiment.

In the embodiment, the starting apparatus 17 may not have a fluid coupling. Note that the "starting apparatus" as used in the present invention refers to a torque transfer apparatus having no torque converter.

The invention claimed is:

1. An automatic transmission, comprising:
a starting apparatus having a housing that rotates based on torque of a driving source, and a clutch mechanism portion positioned in the housing;
an oil pump that is positioned on a side opposite to the driving source with respect to the starting apparatus in a rotational axis direction of the housing, and is driven by transmission of rotation of the housing;
an oil pump housing in which the oil pump is accommodated; and
a speed change mechanism that is positioned on a side opposite to the starting apparatus with respect to the oil pump housing in the rotational axis direction, and has an input shaft, which extends through the oil pump and the oil pump housing and is connected to the clutch mechanism portion, wherein
the clutch mechanism portion operates so as to selectively allow and block torque transfer from the driving source to the input shaft,
the housing includes a cylindrical pump drive shaft extending along the rotational axis toward the oil pump housing, where the pump drive shaft has an inner peripheral surface that faces an outer peripheral surface of the input shaft,
the oil pump is positioned on an outer peripheral side of the pump drive shaft,
the oil pump housing has a pump through hole, which is provided at a position between the oil pump and the speed change mechanism in the rotational axis direction, and through which the input shaft extends, a support member for rotatably supporting the input shaft at an end on the oil pump side of the pump through hole is positioned between an inner peripheral surface of the pump through hole and the outer peripheral surface of the input shaft, the clutch mechanism portion is structured to allow the torque transfer from the driving source to the input shaft when the oil is supplied into a supply space formed in the starting apparatus, the clutch mechanism portion has a connection member for connecting to the input shaft, and the supply space is provided at a position adjacent to the connection member, a first supply flow path extending along the rotational axis, a second supply flow path extending from the first supply flow path toward the connection member, and a third supply flow path extending from the first supply flow path toward a position located closer to the speed change mechanism than the support member in the pump through hole are formed in the input shaft, and a communication flow path for allowing the second supply flow path and the supply space to communicate with each other is formed in the connection member, and the clutch mechanism portion allows the torque transfer from the driving source to the input shaft when the oil is supplied into the supply space through the third supply flow path, the first supply flow path, the second supply flow path, and the communication flow path.

2. The automatic transmission according to claim 1, wherein the housing is structured so that oil circulates therein, and a discharge flow path for discharging the oil that has circulated in the housing out of the housing is formed by the outer peripheral surface of the input shaft, the inner peripheral surface of the pump drive shaft and the support member.

3. The automatic transmission according to claim 1, wherein the housing is structured so that the oil circulates therein, a first circulation flow path having an opening that opens in the housing and extending along the rotational axis, and a second circulation flow path extending from the first circulation flow path toward a position located closer to the speed change mechanism than the support member in the pump through hole, are formed in the input shaft, and the oil is supplied into the housing through the second circulation flow path and the first circulation flow path, while the oil is discharged from the housing through a discharge oil passage.

4. The automatic transmission according to claim 3, wherein the second circulation flow path has a circulation opening formed in the outer peripheral surface of the input shaft, and the third supply flow path has an operation opening formed in the outer peripheral surface of the input shaft, and the circulating opening is positioned closer to the oil pump than the operation opening, and annular outflow restraining members for restraining the oil, which is supplied into the third supply flow path through the operation opening, from at least partially flowing to outside along the outer peripheral surface of the input shaft are respectively provided on both sides of the operation opening in the rotational axis direction in the pump through hole.

5. The automatic transmission according to claim 4, wherein an annular outflow restraining member for restraining the oil, which is supplied into the second circulation flow path through the circulation opening, from at least partially' flowing toward the operation opening along the outer peripheral surface of the input shaft is provided closer to the operation opening than the circulation opening in the pump through hole, and the support member has a support portion for supporting the input shaft, and a restraining portion for restraining the oil, which is supplied into the second circulation flow path through the circulation opening, from at least partially flowing toward the oil pump along the outer peripheral surface of the input shaft, and the support portion and the regulating portion are formed integrally.

6. The automatic transmission according to claim 5, wherein the restraining portion is positioned closer to the oil pump than the support portion.

7. The automatic transmission according to claim 1, wherein the oil pump housing further has a pump through hole, which is provided at a position between the oil pump and the housing in the rotational axis direction, and through which the pump drive shaft and the input shaft extend.

\* \* \* \* \*